United States Patent Office 3,365,419
Patented Jan. 23, 1968

3,365,419
POLYALKYLENE OXIDES STABILIZED WITH A BISPHENOL AND A THIOETHER
Claus Heuck, Hofheim, Taunus, and Otto Mauz, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 18, 1964, Ser. No. 390,470
Claims priority, application Germany, Aug. 20, 1963, F 40,535
8 Claims. (Cl. 260—45.85)

ABSTRACT OF THE DISCLOSURE

The stabilization of polyalkylene oxides with a mixture of an alkylidene bisphenol and an alkyl sulfide or thiodialkanoate.

---

The present invention relates to a process for stabilizing polyalkylene oxides with the aid of a mixture of phenols and thioethers.

It is known that homo- and copolymers of alkylene oxides are more or less liable to degradation at higher temperatures under the action of oxygen and light like all polyethers and that they must be stabilized prior to being processed or used. It has already been proposed to use aromatic amines or phenols as stabilizers for propylene oxide. However, when the polymers are processed at a temperature above 100° C. the said stabilizers are little effective and they do not prevent the polymer from being decomposed at a higher temperature, for example at 110° C.

It has now been found a process for stabilizing polyalkylene oxides using a stabilizer mixture consisting of (I) a phenol of the general formula:

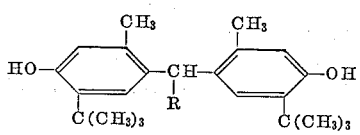

or

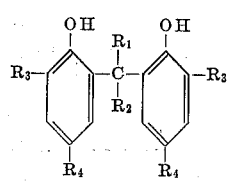

or

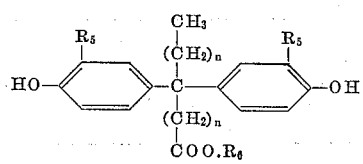

in which R stands for a hydrogen atom, an aliphatic alkyl radical with 1 to 17 carbon atoms, a phenyl radical which may still contain a hydroxyl group and alkyl group or the grouping

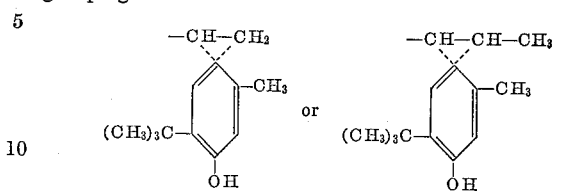

$R_1$ and $R_2$ stand for a hydrogen atom, an aliphatic alkyl group with up to 18 carbon atoms; $R_3$ represents a methyl group, ethyl group or tertiary butyl group, $R_4$ is a branched alkyl radical with up to 12 carbon atoms; $R_5$ stands for a hydrogen atom, an alkyl group with up to 12 carbon atoms; $R_6$ represents an alkyl radical with 1 to 18 carbon atoms and $n$ means zero or a whole number in the range of 1 to 4; and (II) an aliphatic thioether having the general formula $R_7$—$S_n$—$R_7$ in which $R_7$ represents an alkyl radical with 8 to 20 carbon atoms or the group $$-(CH_2)_x-COOR_8$$

$R_8$ being an alkyl radical with 8 to 20 carbon atoms and $x$ a whole number of 1 to 4, and $n$ means a whole number in the range of 1 to 4. In the stabilizer mixture the ratio of component I to component II is in the range of from 1:5 to 5:1.

From among the phenolic components to be used in the process of the invention there are mentioned by way of example: bis(2-hydroxy-3-methyl-5-isooctylphenyl)-methane, 4,4-bis(4-hydroxyphenyl)-pentanoic acid dodecyl ester, 3,3-bis(4-hydroxy-3-methylphenyl)-butanoic acid dodecyl ester, condensation products of 3-methyl-6-tert. butylphenol with croton-aldehyde, butyraldehyde, salicyclic aldehyde, octylsalicyclic aldehyde or acrolein.

The aforesaid condensation products are prepared in known manner, for example as described in the Journal of the American Chemical Society, volume 63, page 1731 (1941) or page 1422 (1939).

As organic sulfur compounds there may be used: thiodiglycolic acid dodecyl ester, thio-dipropionic acid dodecyl ester, di(octadecyl)sulfide, di(octadecyl)disulfide, di(octadecyl)trisulfide, or di(octadecyl)tetrasulfide.

In order to obtain a good stabilizing effect the stabilizer mixtures are preferably used in an amount of 0.3 to 3%, calculated on the weight of the polymerization product, either as solid or as solution. The stabilizer mixture is advantageously added in the course of the processing of the polymerization product directly after the polymerization process. It is likewise possible, however, to add the stabilizer to the solid polymer after processing. In this case mixing can be accomplished, advantageously with the exclusion of air, by rolling on a multiple roll mill as used, for example, in rubber industries or in a suitable kneader or extruder. With the stabilizer mixtures of the invention there can be stabilized homo- and copolymers of alkylene oxides. The said homo- and copolymers are produced by polymerizing saturated alkylene oxides, for example ethylene oxide, propylene oxide and isobutylene oxide, substituted epoxides such as epichlorohydrin, perfluoropropylene oxide and 1-chloro-3,4-epoxybutane, cycloaliphatic epoxides such as cyclohexene oxide, epoxy ethers such as methyl- and phenylglycidyl ethers, or by copolymerizing unsaturated and saturated epoxides, for example allylglycidyl ether, glycidyl acrylate, vinylcyclohexane monoepoxide, cyclohexene oxide, butadiene monoxide and 1,2-epoxy-cyclooctene-(5), in the presence of known ionic catalysts. Especially good results can be obtained with copolymers of saturated and unsaturated alkylene oxides when the stabilization is carried out in the uncrosslinked state, i.e. directly after polymerization. The stabilized polymers obtained are crystalline, amorphous or rubber-like. The stabilizing action of the compounds used according to the invention has been tested in the following manner:

The stabilizer dissolved in benzene was added to the benzenic solution of the polyalkylene oxide or copolymer. A film was made from the thoroughly mixed solution and the film was heated in a drying cabinet at 110° C. with the admission of air. Samples were taken every 24 hours, a benzenic solution of 0.1% strength was prepared and the reduced specific viscosity was measured at 25° C. The drop of the reduced specific viscosity is the measurement for the oxidative degradation of the polymer.

The following examples serve to illustrate the invention, but they are not intended to limit it thereto.

*Example 1*

In Table 1 comparative experiments 1 to 3 show the results obtained with phenols to be used according to the invention without the addition of sulfur compounds. The compounds used in Experiments 4 and 5 are the stabilizers disclosed in U.S. Patent 2,706,189, page 2, column 3. The comparative experiments show that the sole use of the phenols (Experiments 1–5) has a little stabilizing effect whereas the sole use of the thio compounds (Experiments 6–8) is practically without stabilizing effect. As polymer a polymer of propylene oxide was used and the films were heated at 110° C.

*Example 2*

The polymer used was a polymer of propylene oxide. The film was stabilized with 0.5% by weight of a phenol compound and 0.5% by weight of a thio compound. The films were heated at 110° C. The results obtained are recited in Table 2. Experiments 10–14 show that the combination of relatively little active phenol compounds with practically uneffective sulfur compounds has an excellent stabilizing effect. An unstabilized polymer film is completely decomposed after having been heated at 110° C. for 3 hours.

*Example 3*

A copolymer of propylene oxide with 1,2-epoxy-cyclooctene-(5) was used. The stabilizer combination was added in an amount of 1% by weight. The films were heated at 110° C. The results obtained are summarized in Table 3.

*Example 4*

A copolymer of propylene oxide and allylglycidyl ether was stabilized. The film was heated at a temperature of 110° C. The results obtained are listed in Table 4.

TABLE 1

| Experiment No. | Stabilizer | Conc. percent by weight | $\eta$ red. initial value | $\eta$ red. after 24 hrs. | $\eta$ red. after 48 hrs. |
|---|---|---|---|---|---|
| 1 | Bis(2-hydroxy-3-methyl-5-isooctylphenyl)-methane-(1). | 1 | 13.85 | 2.71 | 1.15 |
| 2 | 3,3-bis(4-hydroxy-3-methylphenyl) butanoic acid dodecyl ester. | 1 | 14.00 | 3.15 | 1.97 |
| 3 | 3-methyl-6-tert.butylphenol/crotonaldehyde condensation product. | 1 | 13.95 | 3.95 | 2.71 |
| 4 | 2,6-di-tert.butyl-p-cresol. | 1 | 13.71 | 1.21 | 0.13 |
| 5 | Bis(4-hydroxyphenyl)-propane-(2). | 1 | 13.62 | 1.61 | 0.41 |
| 6 | Thio-dipropionic acid dodecyl ester. | 1 | 13.88 | 0.97 | |
| 7 | Di(n-octadecyl) disulfide. | 1 | 13.97 | 0.98 | |
| 8 | Di(n-octadecyl) trisulfide. | 1 | 13.79 | 0.76 | 0.61 |

TABLE 2

| Experiment No. | Stabilizer | Conc. percent by weight | $\eta$ red. initial value | $\eta$ red. after 24 hours | $\eta$ red. after 6 days | $\eta$ red. after 10 days | $\eta$ red. after 20 days |
|---|---|---|---|---|---|---|---|
| 10 | 3-methyl-6-tert.butylphenol/crotonaldehyde condensation product.<br>Thio-dipropionic acid dodecyl ester. | 0.5<br>0.5 | 11.3 | 8.2 | 6.5 | 3.3 | 2.1 |
| 11 | 3-methyl-6-tert.butylphenol/butyraldehyde condensation product.<br>Thio-dipropionic acid dodecyl ester. | 0.5<br>0.5 | 11.7 | 8.5 | 6.3 | 4.2 | 3.0 |
| 12 | 3-methyl-6-tert.butylphenol/octylsalicylic aldehyde.<br>Di(n-octadecyl) disulfide. | 0.5<br>0.5 | 10.9 | 8.7 | 8.0 | 6.9 | 4.3 |
| 13 | Bis(2-hydroxy-3-methyl-5-isononylphenyl)-dimethylmethane.<br>Thio-dipropionic acid dodecyl ester. | 0.5<br>0.5 | 11.6 | 8.1 | 7.5 | 5.7 | 2.8 |
| 14 | Without stabilizer (comparative experiment) | | 11.2 | after 3 hours $\eta$ red. 0.19 | | | |

TABLE 3

| Experiment No. | Stabilizer | Conc. percent by weight | η red. initial value | η red. after 3 hours | η red. after 24 hours | η red. after 48 hours | η red. after 6 days | η red. after 8 days | η red. after 10 days | η red. after 14 days | η red. after 17 days | η red. after 20 days | η red. after 22 days | η red. after 24 days |
|---|---|---|---|---|---|---|---|---|---|---|---|---|---|---|
| 15 | Without stabilizer | | 13.85 | 0.23 | | | | | | | | | | |
| 16 | bis(2-hydroxy-3-methyl-5-isooctyl-phenyl)-methane-(1). | 0.5 | 13.86 | | 9.43 | 7.69 | 6.25 | 5.79 | 5.40 | 5.07 | 4.54 | 4.22 | 3.35 | 3.92 |
|    | Thio-dipropionic acid dodecyl ester. | 0.5 | | | | | | | | | | | | |
| 17 | 3,3-bis(4-hydroxy-3-methylphenyl)-butanoic acid dodecyl ester. | 0.5 | 13.95 | | 8.13 | 8.02 | 6.40 | 5.66 | 4.70 | 4.25 | 3.96 | 3.93 | 3.40 | 3.03 |
|    | Di(n-octadecyl)-disulfide. | 0.5 | | | | | | | | | | | | |
| 18 | 3-methyl-6-tert.butyl-phenol/crotonaldehyde condensation product. | 0.5 | 14.15 | | 10.55 | 10.23 | 8.31 | 8.25 | 7.86 | 7.16 | 6.42 | 6.17 | 2.86 | 2.75 |
|    | Thio-dipropionic acid dodecyl ester. | 0.5 | | | | | | | | | | | | |
| 19 | 3-methyl-6-tert.butyl-phenol/crotonaldehyde condensation product. | 0.5 | 13.85 | | 9.55 | 8.21 | 6.39 | 6.30 | 5.87 | 5.46 | 5.27 | 4.30 | 4.11 | 3.98 |
|    | Di(n-octadecyl)-disulfide. | 0.5 | | | | | | | | | | | | |
| 20 | Bis(2-hydroxy-3-methyl-5-isooctyl-phenyl)-dimethyl-methane-(1). | 0.5 | 13.85 | | 8.60 | 8.21 | 5.85 | 5.35 | 3.90 | 2.90 | 2.30 | 2.25 | 1.80 | 1.71 |
|    | Di(n-octadecyl)-trisulfide. | 0.5 | | | | | | | | | | | | |

TABLE 4

| Experiment No. | Stabilizer | Conc. percent by weight | η red. initial value | η red. after 24 hours | η red. after 48 hours | η red. after 6 days | η red. after 10 days | η red. after 14 days | η red. after 20 days |
|---|---|---|---|---|---|---|---|---|---|
| 21 | 3-methyl-6-tert.butylphenol/acrolein | 0.5 | 13.7 | 8.3 | 7.1 | 6.1 | 4.2 | 3.2 | 2.1 |
|    | Thio-dipropionic acid dodecyl ester | 0.5 | | | | | | | |
| 22 | 3-methyl-6-tert.butylphenol/heptanol | 0.5 | 13.2 | 10.5 | 9.7 | 7.9 | 6.1 | 5.4 | 4.9 |
|    | Di(n-octadecyl) trisulfide | 0.5 | | | | | | | |
| 23 | 4,4-bis(4-hydroxyphenyl)-pentanoic acid dodecyl ester. | 0.5 | 13.2 | 9.3 | 8.6 | 6.8 | 5.1 | 4.6 | 3.2 |
|    | Di(n-octadecyl) disulfide | 0.5 | | | | | | | |

We claim:
1. A polyalkylene oxide polymer stabilized by from 0.3 to 3.0 percent by weight of a mixture consisting of (I) a phenol selected from the group consisting of a phenol of the formula (a)

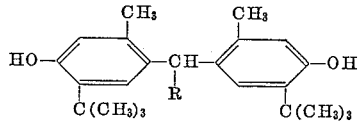

a phenol of the formula (b)

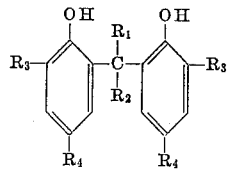

and a phenol of the formula (c)

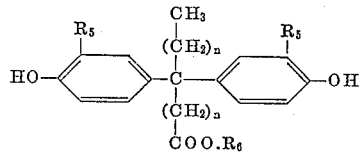

wherein R is a member selected from the group consisting of hydrogen, aliphatic alkyl having up to 17 carbon atoms, phenyl, phenyl containing a hydroxyl and an alkyl group, the group

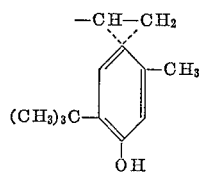

and the group

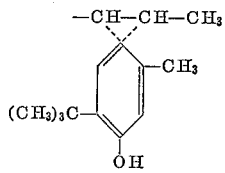

$R_1$ and $R_2$ are members selected from the group consisting of hydrogen and aliphatic alkyl having up to 18 carbon atoms, $R_3$ is a member selected from the group consisting of methyl, ethyl and tert.butyl, $R_4$ stands for branched alkyl having up to 12 carbon atoms, $R_5$ is a member selected from the group consisting of hydrogen and alkyl having up to 12 carbon atoms, $R_6$ stands for alkyl having up to 18 carbon atoms and $n$ is a whole number in the range of 0 to 4, and (II) an aliphatic thioether of the formula $R_7$—$S_n$—$R_7$ in which $R_7$ is a member selected from the group consisting of alkyl having 8 to 20 carbon atoms and the grouping $$-(CH_2)_xCOOR_8$$

$R_8$ being alkyl having 8 to 20 carbon atoms and $x$ equaling 1 to 4, and $n$ stands for a number in the range of 1 to 4, components I and II being present in a ratio of 1:5 to 5:1.

2. The polymer of claim 1 wherein the phenol has formula $a$.

3. The polymer of claim 1 wherein the phenol has formula $b$.

4. The polymer of claim 1 wherein the phenol has formula $c$.

5. The polymer according to claim 1, wherein the phenol is a condensation product of 3-methyl-6-tert.butyl phenol and butyraldehyde and the thioether is thio-dipropionic acid dodecyl ester.

6. The polymer according to claim 1 wherein the phenol is 3,3-bis(4-hydroxy - 3 - methylphenyl) - butanoic acid dodecyl ester and the thioether is di(n-octadecyl)disulfide.

7. The polymer according to claim 1 wherein the phenol is a condensation product of 3-methyl-6-tert.butyl phenol and crotonaldehyde and the thioether is di(n-octadecyl)disulfide.

8. The polymer according to claim 1 wherein the phenol is bis(2 - hydroxy-3-methyl - 5 - isooctylphenyl)-methane-(1) and the thioether is thio-dipropionic acid dodecyl ester.

References Cited

UNITED STATES PATENTS 3,204,014  8/1965  Green _____ 260—89.5
3,277,044  10/1966  Weissermel et al. ____ 260—45.8

DONALD E. CZAJA, *Primary Examiner.*

V. P. HOKE, *Assistant Examiner.*